United States Patent
Lin

(10) Patent No.: US 6,820,338 B2
(45) Date of Patent: Nov. 23, 2004

(54) ELECTRICAL GARDENING TOOL WITH A REPLACEABLE WORKING PIECE

(75) Inventor: Paul Lin, Yung-Kang (TW)

(73) Assignee: Macauto Industrial Co., Ltd., Yung-Kang (TW)

( * ) Notice: Subject to any disclaimer, the term of this patent is extended or adjusted under 35 U.S.C. 154(b) by 47 days.

(21) Appl. No.: 10/388,152

(22) Filed: Mar. 13, 2003

(65) Prior Publication Data
US 2004/0177512 A1 Sep. 16, 2004

(51) Int. Cl.[7] ............................. B25B 3/00; B25B 5/00
(52) U.S. Cl. ..................... 30/122; 30/277.4; 30/392; 30/DIG. 1
(58) Field of Search ............................. 30/DIG. 1, 122, 30/392, 383, 277.4, 272.4

(56) References Cited

U.S. PATENT DOCUMENTS

| | | | | |
|---|---|---|---|---|
| 4,991,298 A | * | 2/1991 | Matre | 30/392 |
| 5,685,080 A | * | 11/1997 | Amano et al. | 30/383 |
| 6,112,419 A | * | 9/2000 | Uhl et al. | 30/383 |
| 6,161,293 A | * | 12/2000 | Watson | 30/377 |
| 6,487,779 B1 | * | 12/2002 | Underthun | 30/277.4 |

* cited by examiner

Primary Examiner—Douglas D. Watts
(74) Attorney, Agent, or Firm—Cowan, Liebowitz & Latman, P.C.; Eugene L. Flanagan, III

(57) ABSTRACT

An electrical gardening tool includes a working piece having a main body, and a seat body with a base seat. The main body includes a coupling strip with actuating and hook ends and a projection that is disposed within the main body, and a side wall with a slot. The base seat has a coupling end surface that is formed with a fixed bar to engage the hook end so as to fix the seat body to the working piece. The actuating end of the coupling strip is rotatable forcibly relative to the main body to turn the projection out of the main body through the slot so as to remove the hook end from the bar, thereby permitting removal of the seat body from the working piece.

4 Claims, 5 Drawing Sheets

ELECTRICAL GARDENING TOOL WITH A REPLACEABLE WORKING PIECE

BACKGROUND OF THE INVENTION

1. Field of the Invention

The invention relates to an electrical gardening tool, more particularly to an electrical gardening tool with a replaceable working piece.

2. Description of the Related Art

A conventional electrical gardening tool comprises a main body, a cutting member mounted fixedly on one end of the main body, and a battery unit disposed detachably on the other end of the main body. However, the conventional electrical gardening tool can only accomplish a limited trimming task such that when a worker proceeds with a gardening task, he or she has to prepare different kinds of gardening tools, which occupy a relatively large amount of space and which increase the purchasing cost. Furthermore, the worker has to prepare different kinds of batteries to conform to different gardening tools. As such, the conventional electrical gardening tool is inconvenient to use.

SUMMARY OF THE INVENTION

Therefore, the object of the present invention is to provide an electrical gardening tool that is capable of overcoming the aforementioned drawbacks of the prior art.

According to this invention, an electrical gardening tool comprises a working piece and a seat body. The working piece includes a hollow main body that has opposite inner and outer ends, a cutting member that is mounted fixedly on the outer end of the main body, and a coupling strip disposed pivotally on the main body at a position adjacent to the inner end of the main body. The main body further has an inner end surface that is formed with an opening, a first engagement element that is disposed fixedly on the inner end of the main body, and a side wall that is formed with a slot therethrough. The coupling strip has an actuating end that extends outwardly from the main body through the slot in the side wall, a hook end that is opposite to the actuating end and that extends outwardly from the main body through the opening in the inner end surface, and a projection that is formed on the coupling strip near the actuating end and inside the main body. The projection is sized to prevent removal of the coupling strip from the main body through the slot, and is movable forcibly through the slot. The seat body includes a base seat and a battery seat that is connected detachably to the base seat and that is connected operatively to the cutting member so as to drive the cutting member. The base seat includes a coupling end surface that is formed with a second engagement element and a bar which are fixed on two opposite sides of the coupling end surface. One of the first and second engagement elements is constructed as a pin. The other one of the first and second engagement elements is constructed as a hook that engages the pin so as to permit rotation of the hook about the pin. The hook end of the coupling strip engages the bar to cooperate with the first and second engagement elements so as to prevent rotation of the hook about the pin. The actuating end of the coupling strip is rotatable forcibly within the main body to turn the projection to a position outside of the main body so as to remove the hook end of the coupling strip from the bar, thereby permitting removal of the seat body from the working piece.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
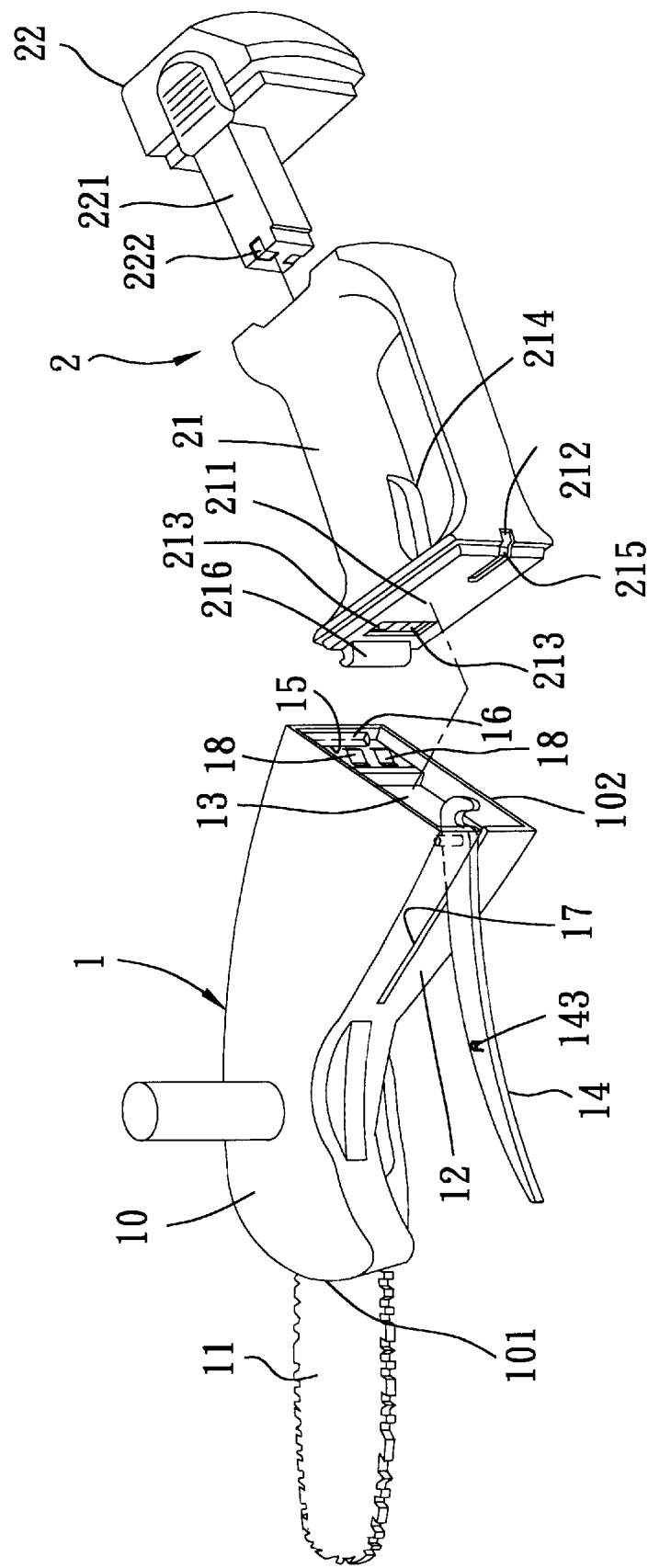
FIG. 1 is a partly exploded perspective view of the first preferred embodiment of an electrical gardening tool according to the present invention.

Before the present invention is described in greater detail, it should be noted that like elements are denoted by the same reference numerals throughout the disclosure.

Referring to FIGS. 1 to 4, the first preferred embodiment of an electrical gardening tool according to the present invention is shown to comprise a working piece 1 and a seat body 2.

The working piece 1 includes a hollow main body 10 that has opposite inner and outer ends 102, 101, a cutting member 11 that is mounted fixedly on the outer end 101 of the main body 10, and a coupling strip 14 disposed pivotally on the main body 10 at a position adjacent to the inner end 102 of the main body 10. The main body 10 further has an inner end surface that is formed with an opening 13, a positioning hole 15 formed in the inner end surface and distal from the coupling strip 14, a first engagement element 16 that is disposed fixedly in the positioning hole 15 in the main body 10, and a side wall 12 that is formed with a slot 17 therethrough. The working piece 1 is also provided with two first conductive plates 18 that are disposed on the inner end surface of the main body 10. A motor (not shown) and a transmitting device (not shown) are provided inside the main body 10 in a known manner. When an electrical current passes through the conductive plates 18, the motor is activated, and through the transmitting device, the cutting member 11 is actuated. Since the operating principle of the motor and the transmitting device are known in the art, a detailed description of the same will be dispensed with herein for the sake of brevity.

The first engagement element 16, in this embodiment, is constructed as a pin. The coupling strip 14 has an actuating end 141 (see FIG. 2) that extends outwardly from the main body 10 through the slot 17 in the side wall 12 of the main body 10, a hook end 142 (see FIG. 2) that is opposite to the actuating end 141 and that extends outwardly from the main body 10 through the opening 13 in the inner end surface, a projection 143 that is formed on the coupling strip 14 near the actuating end 141 and inside the main body 10, and a U-shaped slot 144 (see FIG. 4) formed therethrough to define a resilient plate 145 (see FIG. 4), on which the projection 143 is formed. The projection 143 is sized to prevent removal of the coupling strip 14 from the main body 10 through the slot 17, and is movable forcibly through the slot 17.

Figure 2:
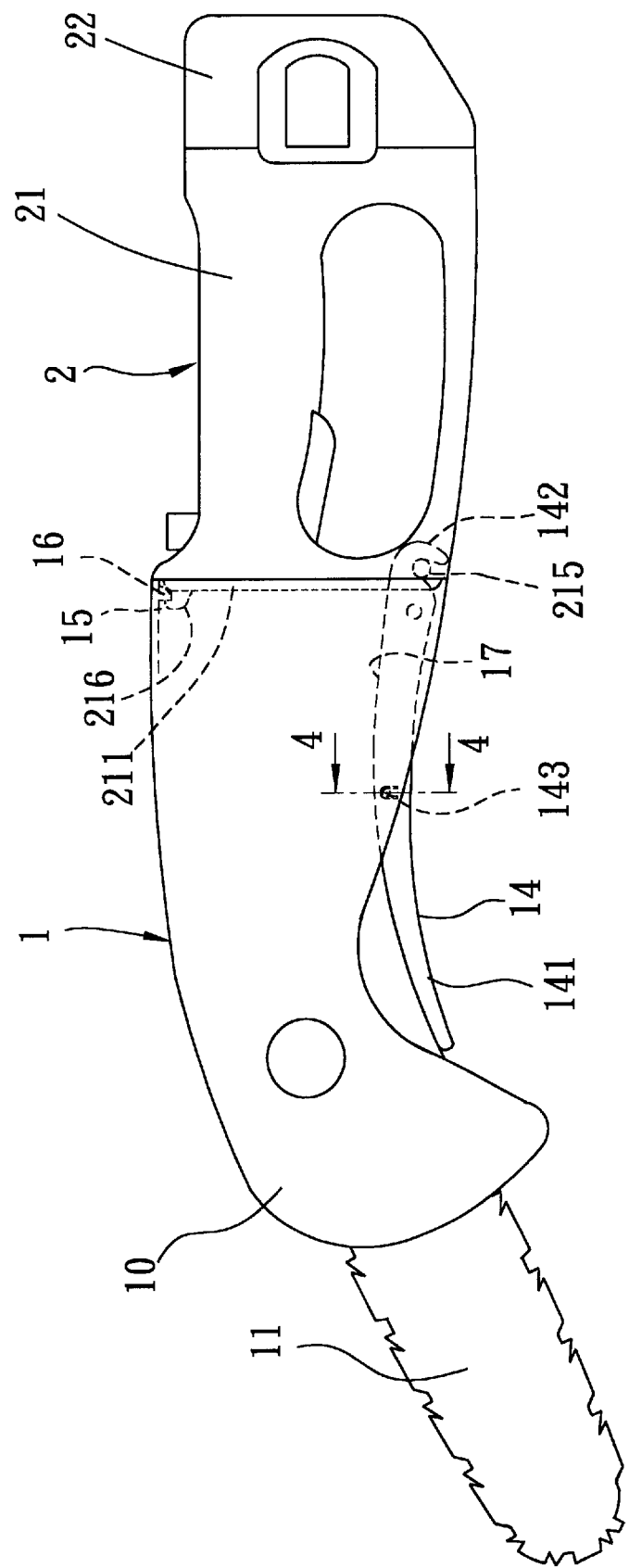
FIG. 2 is a schematic view of the first preferred embodiment in an assembled state.

The cutting member 11 is adapted for trimming different kinds of shrubs and weeds. Since the different forms of the cutting member 11 are already known and widely used in the market, a simple representation of the cutting member 11 is shown in FIGS. 1 and 2.

The seat body 2 is connected detachably to the inner end 102 of the main body 10 of the working piece 1, and includes a base seat 21 and a battery seat 22 that is connected detachably to the base seat 21 and that is connected operatively to the cutting member 11 so as to drive the same. The base seat 21 is disposed between the working piece 1 and the battery seat 22, and includes a coupling end surface 211 that is formed with a second engagement element 216 and a bar 215 which are fixed on two opposite sides of the coupling end surface 211, an engaging hole 212 formed in the coupling end surface 211 so that the bar 215 is located thereon, and two second conductive plates 213 that are disposed on the coupling end surface 211 for electrical connection with the first conductive plates 18, respectively.

The second engagement element 216, in this embodiment, is constructed as a hook that engages the pin of the first engagement element 16 so as to permit rotation of the hook about the pin. The hook end 142 of the coupling strip 14 engages the bar 215 to cooperate with the engagement of the hook and the pin so as to prevent rotation of the hook about the pin.

The actuating end 141 of the coupling strip 14 is rotatable forcibly within the main body 10 to turn the projection 143 to a position outside of the main body 10 so as to remove the hook end 142 of the coupling strip 14 from the bar 215, thereby permitting removal of the seat body 2 from the working piece 1.

The battery seat 22, which accommodates a storage battery, provides electrical power to the working piece 1, and includes an insert portion 221 and two conductive units 222 provided on one end of the insert portion 221. Since the battery seat 22 is not pertinent to the claimed invention, and since its operating principle is already known in the art, a detailed description of the same will be dispensed with herein for the sake of brevity.

The base seat 21 further includes a push button 214 for controlling on and off operating states of the cutting member 11. The push button 214 has an inner portion provided with an electrical contact for making connection between the conductive units 222 of the battery seat 22 and the second conductive plates 213. When the base seat 21 and the working piece 1 are interconnected, electrical power provided by the battery seat 22 is transmitted from the conductive units 222, through the second conductive plates 213, and to the first conductive plates 18 of the working piece 1.

Figure 3:
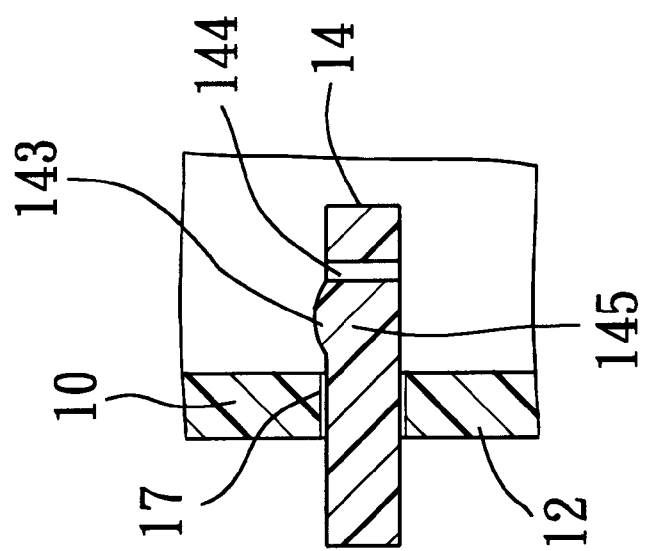
FIG. 3 is a fragmentary sectional view showing a coupling strip and a side wall of a working piece of the first preferred embodiment.
Figure 4:
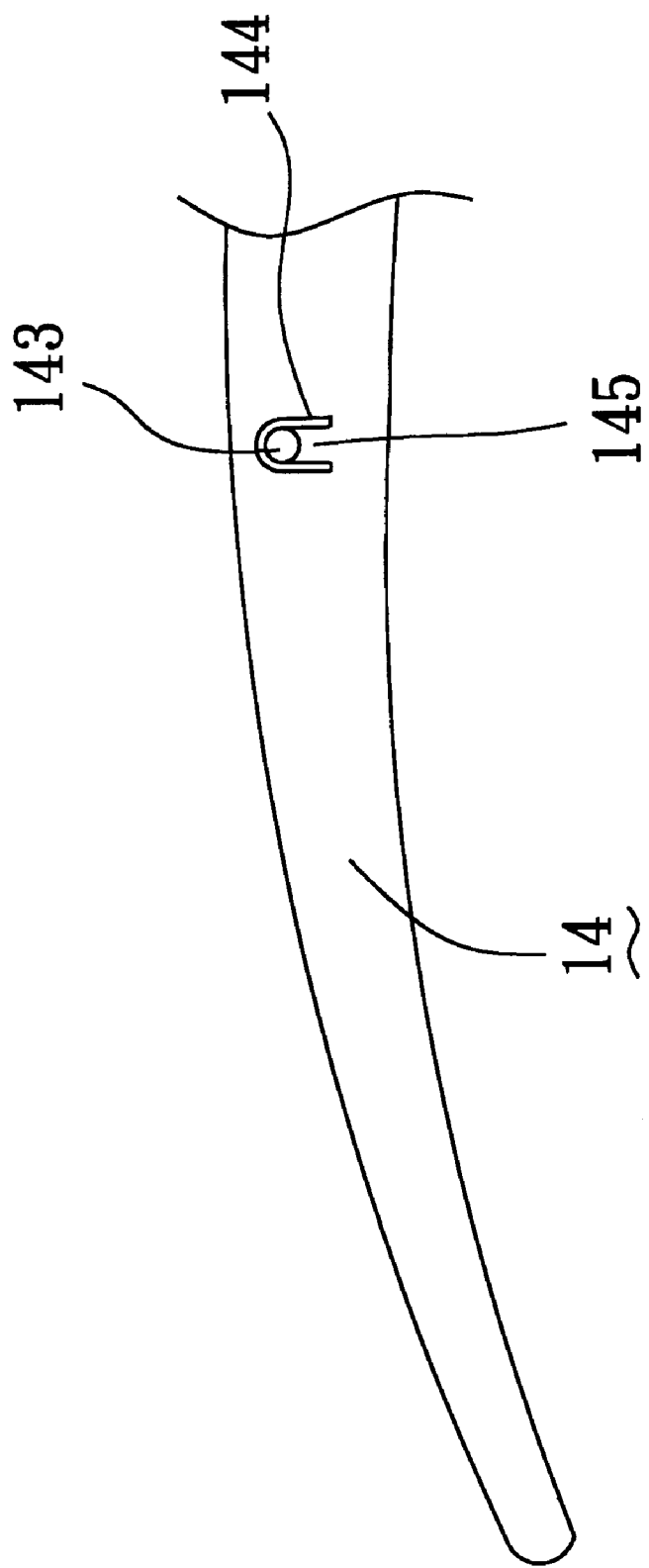
FIG. 4 is a fragmentary schematic view of the coupling strip of the first preferred embodiment.

Referring to FIGS. 1 and 3, when the working piece 1 and the seat body 2 are to be assembled together, the inner end surface of the working piece 1 and the coupling end surface 211 of the seat body 2 are brought to face each other, the hook is extended into the positioning hole 15 to engage the pin, and the hook end 142 of the coupling strip 14 is extended into the engaging hole 212 in the coupling end surface 211 of the base seat 21. Then, the actuating end 141 of the coupling strip 14 is pushed forcibly into the main body 10 of the working piece 1 so that the hook end 142 of the coupling strip 14 moves to engage the bar 215. At this time, the projection 143 on the coupling strip 14 limits and retains the coupling strip 14 within the slot 17. Thus, the base seat 21 is connected detachably to the main body 10 of the working piece 1, after which the insert portion 221 of the battery seat 22 is inserted into the base seat 21 so that the electrical power inside the battery seat 22 can be transmitted to the cutting member 11, thereby permitting activation of the cutting member 11 to perform a cutting function. The push button 214 is operable between an on position to start a cutting operation, and an off position after the cutting operation is accomplished.

Figure 5:
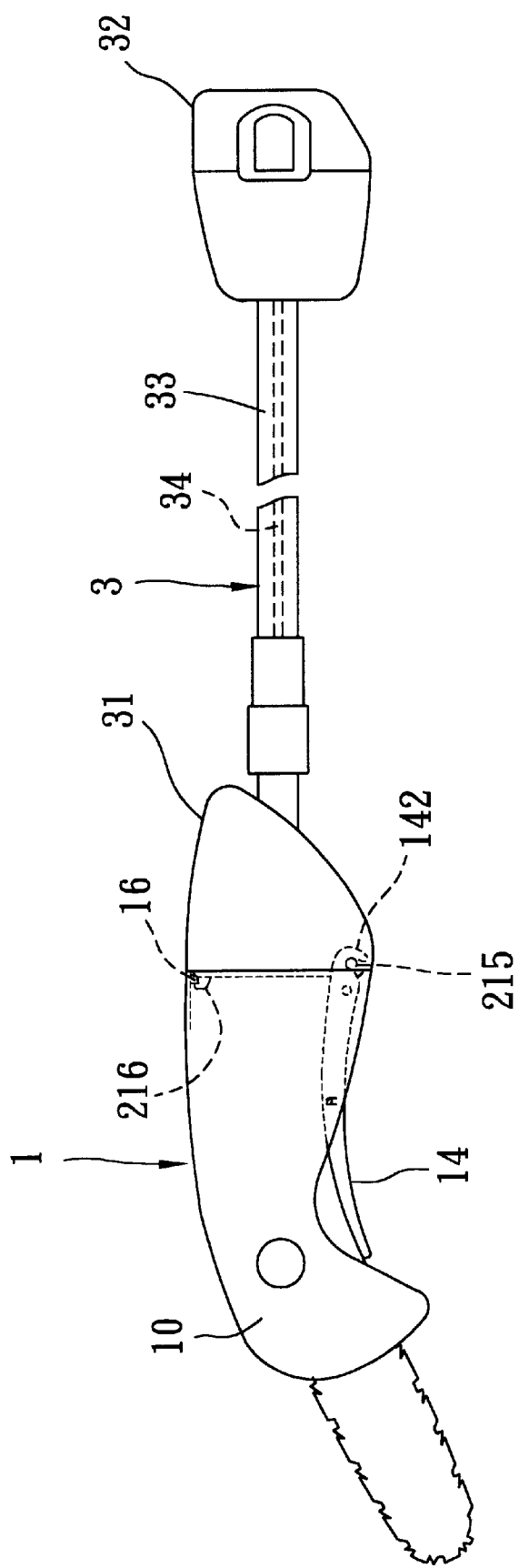
FIG. 5 is a schematic view of the second preferred embodiment of an electrical gardening tool according to the present invention.

Referring to FIG. 5, the second preferred embodiment of an electrical gardening tool according to the present invention is shown to be substantially similar to the first preferred embodiment. Particularly, the seat body 3 includes a base seat 31 having a coupling end surface that is formed with a hook for engaging the pin on the main body 10 of the working piece 1 and a bar 215 for engaging the hook end 142 of the coupling strip 14, and a battery seat 32 connected removably to the base seat 31. However, in this embodiment, a tube 33 interconnects the base seat 31 and the battery seat 32 and is adapted to permit extension of an electrical cable unit 34 therethrough. The assembly process and operation of the second preferred embodiment are substantially similar to those of the first preferred embodiment.

From the above description of the preferred embodiments, it is apparent that with the cooperative engagements of the hook with the pin and the hook end 142 of the coupling strip 14 with the bar 215, the working piece 1 and the seat body 2, 3 can be connected detachably to each other. When a worker requires a different type of gardening tool, it is only necessary to replace the working piece 1. Thus, the advantages of the electrical gardening tool of the present invention can be summarized as follows:

1. Different working pieces can be mounted on the same seat body 2, 3. Accordingly, the storing space, as well as the purchasing cost, can be saved.
2. Since it is not necessary to replace the seat body 2, 3 to cooperate with different working pieces, preparation of the battery seat 22 is quite simple, that is, only a single specification is needed.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An electrical gardening tool comprising:

a working piece including a hollow main body that has opposite inner and outer ends, a cutting member that is mounted fixedly on said outer end of said main body, and a coupling strip disposed pivotally on said main body at a position adjacent to said inner end of said main body, said main body further having an inner end surface that is formed with an opening, a first engagement element that is disposed fixedly on said inner end of said main body, and a side wall that is formed with a slot therethrough, said coupling strip having an actuating end that extends outwardly from said main body through said slot in said side wall, a hook end that is opposite to said actuating end and that extends outwardly from said main body through said opening in said inner end surface, and a projection that is formed on said coupling strip near said actuating end and inside said main body, said projection being sized to prevent removal of said coupling strip from said main body through said slot and being movable forcibly through said slot; and a seat body including a base seat and a battery seat that is connected detachably to said base seat and that is connected operatively to said cutting member so as to drive said cutting member, said base seat including a coupling end surface that is formed with a second engagement element and a bar which are fixed on two opposite sides of said coupling end surface, one of said first and second engagement elements being constructed as a pin, the other one of said first and second engagement elements being constructed as a hook that engages said pin so as to permit rotation of said hook about said pin, said hook end of said coupling strip engaging said bar to cooperate with said first and second engagement elements so as to prevent rotation of said hook about said pin, said actuating end of said coupling strip being rotatable forcibly within said main body to turn said projection to a position outside of said main body so as to remove said hook end of said coupling strip from said bar, thereby permitting removal of said seat body from said working piece.

2. The electrical gardening tool of claim 1, wherein said coupling strip further has a U-shaped slot formed therethrough to define a resilient plate, on which said projection is formed.

3. The electrical gardening tool of claim 1, wherein said working piece is provided with two first conductive plates that are disposed on said inner end surface, said seat body including two second conductive plates that are disposed on said coupling end surface for electrical connection with said first conductive plates, respectively.

4. The electrical gardening tool of claim 1, further comprising a tube that interconnects said base seat and said battery seat and that is adapted to permit extension of an electrical cable unit therethrough.

* * * * *